May 20, 1941.  H. G. EVITT  2,242,698
SANITARY RECEPTACLE
Filed Sept. 23, 1937  2 Sheets-Sheet 1

Inventor
HARRY G. EVITT
By Semmes & Semmes
Attorneys

May 20, 1941.  H. G. EVITT  2,242,698
SANITARY RECEPTACLE
Filed Sept. 28, 1937  2 Sheets—Sheet 2
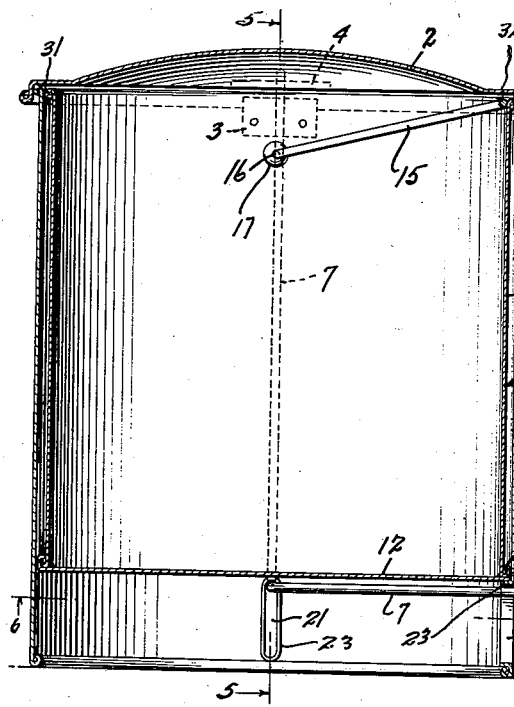
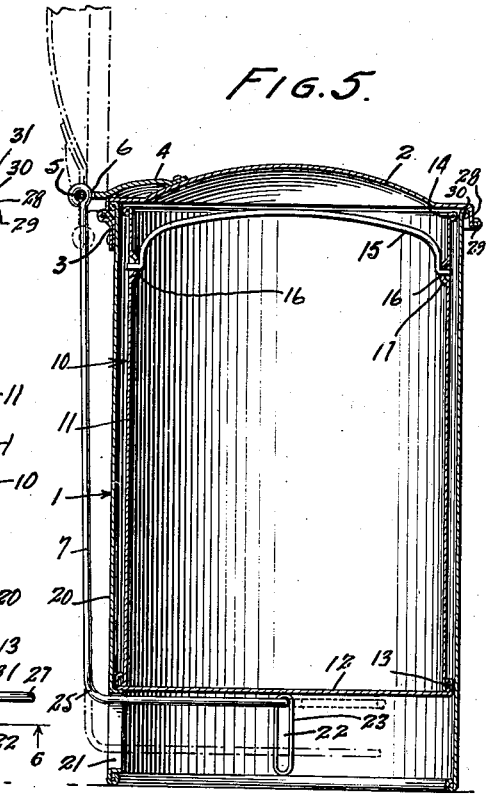
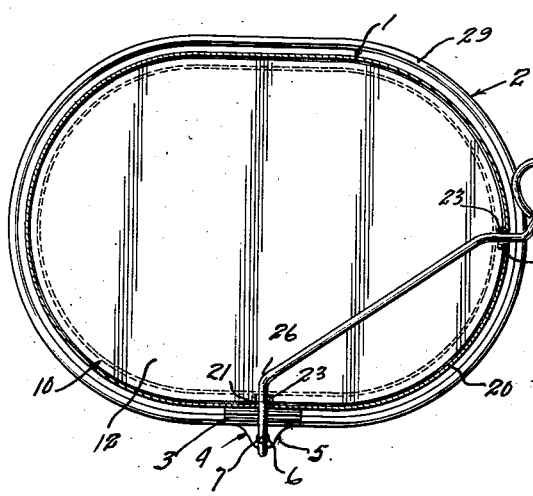
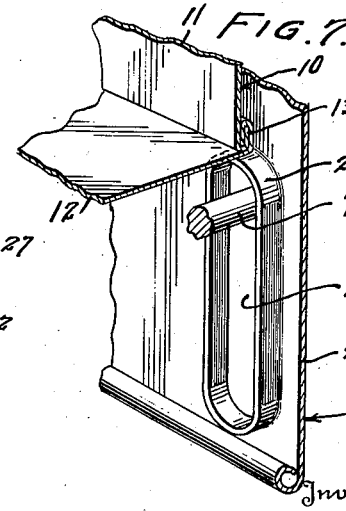
Inventor
HARRY G. EVITT
By Semmes & Semmes
Attorneys Patented May 20, 1941

2,242,698

UNITED STATES PATENT OFFICE 2,242,698

SANITARY RECEPTACLE

Harry G. Evitt, Baltimore, Md.

Application September 28, 1937, Serial No. 166,156

3 Claims. (Cl. 220—36)

This invention relates to sanitary receptacles and more particularly to a sanitary receptacle provided with an outer and inner container.

One of the objects of my invention is to provide a sanitary receptacle, having an outer and an inner container, that is of simple construction and efficient in operation.

Another object of my invention is to provide a sanitary receptacle having an outer container, the top of which may be readily raised by means of a foot treadle.

Still another object of my invention is to provide a sanitary receptacle having an inner container which is supported by the inturned edges of the apertures in the outer container, through which the foot treadle extends.

Yet another object of my invention is to provide a sanitary receptacle having an outer and an inner container, both of which are substantially oval in shape.

Yet another object of my invention is to provide an inner container, the upper and lower edges of which fit snugly against the walls of the outer container.

Still another object of my invention is to provide a means for operating the hinged top of the outer container by means of an operating lever, which is formed in one piece.

My invention consists of a sanitary receptacle, which may be made of any suitable material and which consists of an outer and an inner container. The outer container is provided with a hinged top, operated by a foot treadle which extends through openings in the lower sides of the outer container and is then bent and extends upwardly to the hinged top. The inner container fits snugly within the outer container and rests upon inturned edges of the openings in the outer container, through which the foot treadle extends.

In the drawings:

Figure 4 shows a vertical, transverse sectional view of the receptacle and inner container with the top lowered.

Figure 5 shows a vertical, sectional view taken along the line 5—5 of Figure 4, showing raised position of the top in dotted lines.

Figure 6 is a view taken along line 6—6 looking in the direction of the arrows.

Figure 7 is a fragmentary perspective view showing the bottom of the inner container resting on the inturned edge of the elongated opening of the outer container.

Figure 1:
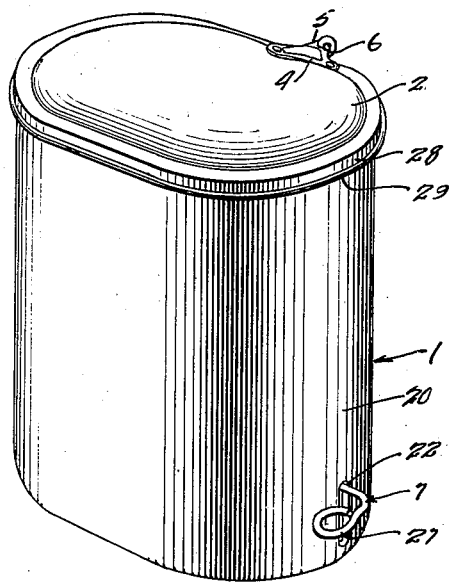
Figure 1 is a front perspective view of my metallic receptacle.
Figure 2:
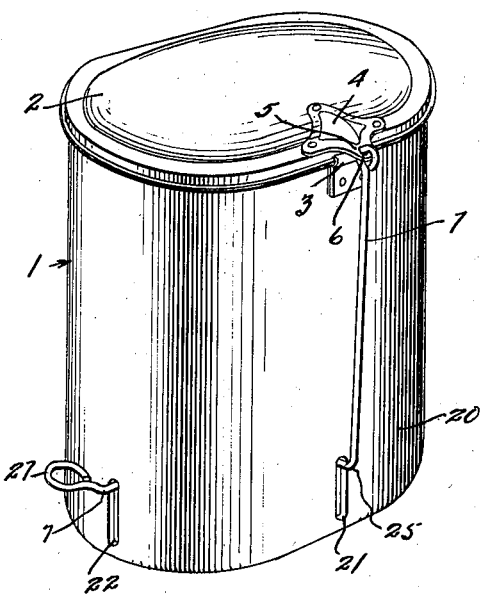
Figure 2 shows a rear perspective view of my invention.

As shown in the drawings, my invention consists of an oval-shaped sanitary receptacle, having an outer container, designated generally by the numeral 1, which is provided with a domed top 2 to which is attached the outer container 1 by means of a hinge 3.

Attached to the top 2 is a rectangular-shaped plate 4, which extends beyond the periphery of the oval-shaped top 2 to form a projection 5, having an aperture 6. A rod 7 is attached to the rectangular plate by looping one of the extremities of the rod 7 through the aperture 6 and then extending it in a downward direction.

Figure 3:
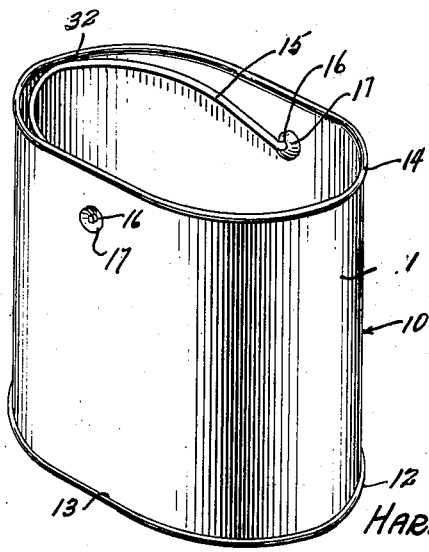
Figure 3 is a perspective view of the inner container.

As shown in Figure 3, the inner container designated generally by the numeral 10 is provided with oval sides 11 and a bottom 12 to which it is attached by crimping, to form the rolled edge 13. The upper edge of the container 10 is provided with a bead 14 which causes the inner container 10 to form a snug fit with the inner surface of the outer container 1 when it is inserted therein. The inner container 10 is also provided with a handle 15, the extremities of which are pivotally mounted in apertures 16 in the oval sides 11. These apertures may be formed in instruck portions of the sides 11 as shown at 17.

As best shown in Figure 5, the sides 20 of the outer container 1 contain two elongated openings 21 and 22. As shown in Figure 7, these elongated openings, 21 and 22, are provided with inturned edges 23, upon which the bottom 12 of the inner container 10 will rest when inserted in the outer container 1.

As best shown in Figure 5, the rod 7 extends downwardly from the top 2 along the outside of the outer container 1 to a point just below the bottom 12 of the inner container 10. As shown in Figure 6, the rod 7 is then bent to form an angle as shown at 25, and then extends in a horizontal plane through the elongated opening 21. After entering the outer container, the rod 7 is again bent as shown at 26 and extends laterally across one portion of the outer container 1 and emerges through aperture 22 in the side of the outer container. At this point, it is bent into a loop to form the foot pedal 27.

As shown in Figure 4, the top 2 is domed and provided with a turned down annular edge 28 which is rolled to form a bead 29. When closed the top 2 extends over a bead 30, which is formed by rolling the upper edge of the outer container 1. The snug fit between the bead 14 of the inner container 10 and the inner surface of the outer container 1 is also shown in this figure at 31. The handle 15 rests within the inner container 10, when not in use, as shown at 32. The domed top 2 will also tend to force the handle 15 to its nested position.

It is obvious from the above description that when the foot treadle 27 is pressed, that the rod 7 will be forced downwardly in the elongated openings 21 and 22. This movement of the rod 7 will cause a tension on the projection 5 which is securely attached to the top 2 and will cause a movement of the top, thereby causing the top to open by rotation on the hinge 3 acting as an axis. After the top has been opened, the inner container is exposed to view and waste material can be deposited therein or the inner container may be removed by use of a handle 15.

In the above description, it is apparent that I have provided a sanitary receptacle, having inner and outer containers, which is efficient in operation and economical to manufacture. By providing a rod and treadle, to operate the top of the outer container, which is in one piece, all possibility of the device becoming inoperative through rusting of joints or ill use is avoided.

I have found that by having the receptacle of oval configuration, it can be positioned with greater ease beneath the sink and containers than round containers. Moreover, as the operating pedal is disposed at the side of the container, there can be no danger of the pedal being caught or inadvertently operated.

As the inner container is supported upon the inturned edges of the elongated openings in the outer container, the inner container will be securely supported. The beads provided on the top of both the inner and outer containers afford a snug fit for the inner container against the side of the outer container, and for the outer container against the down-turned portion of the top. The direct attachment of the operating rod to the top by means of an annular plate with a projecting edge also promotes the efficient operation and long life of my receptacle.

While I have shown and described the preferred form of my invention, it is obvious that there can be many modifications and I intend only to be limited by the prior art and the scope of the appended claims.

I claim:

1. In a sanitary receptacle having an outer and an inner container, a hinged top for said outer container, said top being operated by a rod which is attached to the top at one of its extremities and has pedal means at its other extremity, said point of attachment being outside the line of hinging, said outer container having two elongated apertures in its sides, one of said apertures being under the point of connection to the top and the other of said apertures being positioned so that an arc of less than 180° marks its relation to the first mentioned aperture, said rod having a portion passing through both of said apertures whereby said rod is prevented from appreciable swaying from its point of connection to the top.

2. In a sanitary receptacle having an outer and an inner container, a hingeably attached top for said outer container, said top being operated by a rod which is attached to the top at one of its extremities and formed into a foot pedal at its other extremity, said point of attachment being outside the line of hinging at the periphery of the top, said container having two elongated apertures in its sides, one of said apertures being under the point of pivoting of the top and the other of said apertures being positioned so that approximately a quadrant of the outer container separates it from the first mentioned aperture, said rod having a portion passing through both of said apertures substantially horizontally, whereby said rod is limited in side-sway and end-sway, said foot pedal extending along the sides of the outer container away from hinge carrying portion.

3. In a sanitary receptacle having an outer and an inner container, a hinged top for said outer container, said top being operated by a rod which is attached to the top at one of its extremities and has pedal means at its other extremity, said point of attachment being outside the line of hinging, said outer container having two elongated apertures in its sides, one of said apertures being under the point of connection to the top and the other of said apertures being positioned so that an arc of 90° marks its relation to the first mentioned aperture, said rod having a portion passing through said apertures, said portion lying in a plane perpendicular to the plane in which the remaining portion of the rod lies whereby said rod is prevented from appreciable swaying from its point of connection to the top.

HARRY G. EVITT.